US011080593B2

(12) United States Patent
Duranton et al.

(10) Patent No.: US 11,080,593 B2
(45) Date of Patent: Aug. 3, 2021

(54) ELECTRONIC CIRCUIT, IN PARTICULAR CAPABLE OF IMPLEMENTING A NEURAL NETWORK, AND NEURAL SYSTEM

(71) Applicant: COMMISSARIAT A L'ENERGIE ATOMIQUE ET AUX ENERGIES ALTERNATIVES, Paris (FR)

(72) Inventors: Marc Duranton, Orsay (FR); Jean-Marc Philippe, Gif-sur-Yvette (FR); Michel Paindavoine, Plombieres les Dijon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 893 days.

(21) Appl. No.: 14/910,984

(22) PCT Filed: Sep. 29, 2014

(86) PCT No.: PCT/EP2014/070717
§ 371 (c)(1),
(2) Date: Feb. 8, 2016

(87) PCT Pub. No.: WO2015/049183
PCT Pub. Date: Apr. 9, 2015

(65) Prior Publication Data
US 2016/0203401 A1    Jul. 14, 2016

(30) Foreign Application Priority Data

Oct. 4, 2013    (FR) ........................................ 1359666

(51) Int. Cl.
*G06N 3/063* (2006.01)
*G06N 3/06* (2006.01)

(52) U.S. Cl.
CPC ............... *G06N 3/063* (2013.01); *G06N 3/06* (2013.01)

(58) Field of Classification Search
CPC ........... G06N 3/06; G06N 3/063; Y04S 10/54
See application file for complete search history.

(56) References Cited

U.S. PATENT DOCUMENTS 5,167,008 A * 11/1992 Engeler ................. G06N 3/063
706/43
5,253,330 A * 10/1993 Ramacher ................ G06N 3/04
706/42

(Continued)

FOREIGN PATENT DOCUMENTS

EP          0557997 A2 *  9/1993  ............... G06N 3/10
WO    WO1993019431 A1 *  9/1993  ............ G06F 9/3836

OTHER PUBLICATIONS

Siegel, Howard Jay, Robert J. McMillen, and Philip T. Mueller. "A survey of interconnection methods for reconfigurable parallel processing systems." In 1979 International Workshop on Managing Requirements Knowledge (MARK), pp. 529-542. IEEE, 1979. (Year: 1979).*

(Continued)

*Primary Examiner* — Alexey Shmatov
*Assistant Examiner* — Casey R. Garner
(74) *Attorney, Agent, or Firm* — BakerHostetler

(57) ABSTRACT

An implementation of neural networks on silicon for the processing of various signals comprises multidimensional signals such as images. The efficient implementation on silicon of a complete processing chain for the signal via the approach using neural networks is provided. The circuit comprises at least: a series of neuro-blocks grouped together in branches composed of a group of neuro-blocks and a broadcasting bus, the neuro-blocks connected to the broadcasting bus; a routing unit connected to the broadcasting bus (Continued)

of the branches, carrying out the routing and broadcasting of data to and from the branches; a transformation module connected to the routing unit via an internal bus and designed to be connected at the input of the circuit to an external databus, the module carrying out the transformation of input data into serial coded data. The processing operations internal to the circuit are carried out according to a serial communications protocol.

21 Claims, 2 Drawing Sheets

(56) References Cited

U.S. PATENT DOCUMENTS

| | | | | |
|---|---|---|---|---|
| 5,444,822 | A * | 8/1995 | Shinohara | G06N 3/063 706/41 |
| 5,583,964 | A * | 12/1996 | Wang | G06F 9/3879 706/41 |
| 5,751,913 | A * | 5/1998 | Chiueh | G06N 3/082 706/41 |
| 6,016,154 | A * | 1/2000 | Moroo | G06K 9/44 345/442 |
| 6,199,057 | B1 * | 3/2001 | Tawel | G01M 15/11 706/27 |
| 2007/0022063 | A1 * | 1/2007 | Lightowler | G06N 3/063 706/15 |
| 2008/0267188 | A1 * | 10/2008 | Furber | H04L 12/18 370/392 |
| 2013/0159239 | A1 * | 6/2013 | Brown | G06K 9/00986 706/48 |
| 2014/0119457 | A1 * | 5/2014 | MacInnis | H04N 19/40 375/240.26 |
| 2014/0241211 | A1 * | 8/2014 | Zhang | H04L 5/0023 370/255 |
| 2015/0310311 | A1 * | 10/2015 | Shi | G06F 15/8023 382/158 |

OTHER PUBLICATIONS

D. Young et al., "Hardware Realisation of Artificial Neural Network with application to Information Coding," 1994 IEEE International Conference on Neural Networks, IEEE World Congress on Computational Intelligence, vol. 6, pp. 3982-3985.

P. Ienne et al., "GENES IV: A Bit-Serial Processing Element for a Multi-Model Neural-Network Accelerator," 1993 Proceedings, International Conference on Application-Specific Array Processors, 1993, pp. 345-356.

U. Ramacher et al., "SYNAPSE-1: A High-Speed General Purpose Parallel Neurocomputer System," 9th International Proceedings on Parallel Processing Symposium, Apr. 1995, pp. 774-781.

Eppler et al., "High Speed Neural Network Chip for Trigger Purposes in High Energy Physics," 1998 Proceedings on Design, Automation and Test in Europe, pp. 108-115.

N. Mauduit, et al., "Lneuro 1.0: A Piece of Hardware LEGO for Building Neural Network Systems," IEEE Transactions on Neural Networks, vol. 3, No. 3, May 1992, pp. 414-422.

M. Duranton, "L-Neuro 2.3: A VLSI for Image Processing by Neural Networks," 5th International Conference on Microelectronics for Neural Networks and Fuzzy Systems (MicroNeuro '96), 1996, pp. 157-160.

D. Hammerstrom, "A VLSI Architecture for High-Performance, Low-Cost, On-Chip Learning," 1990 IJCNN International Joint Conference on Neural Networks, vol. II, pp. 537-544.

M. Yasunaga et al., "A Self-Learning Neural Network Composed of 1152 Digital Neurons in Wafer-Scale LSIs," 1991 IEEE International Joint Conference on Neural Networks, vol. 3, pp. 1844-1849.

E. Wojciechowski, "SNAP: A Parallel Processor for Implementing Real-Time Neural Networks," Proceedings of the IEEE 1991 National Aerospace and Electronics Conference, 1991, vol. 2, pp. 736-742.

Y. Kondo et al., "A 1.2 GFLOPS Neural Network Chip for high-speed neural network servers," IEEE Journal of Solid-State Circuits, vol. 31, No. 6, pp. 860-864, Jun. 1996.

C. Farabet et al., "NeuFlow: A Runtime Reconfigurable Dataflow Processor for Vision," 2011 IEEE Computer Society Conference on Computer Vision and Pattern Recognition Workshops (CVPRW), pp. 109-116, Jun. 2011.

V. Konda et al., "A SIMDizing C Compiler for the Mitsubishi Electric Neuro4 Processor Array," Mitsubishi Electric Research Laboratories, Dec. 18, 1995, MERL/SV 95TR031.

Clement Farabet et al., "NeuFlow: A Runtime Reconfigurable Dataflow Processor for Vision," 2011 IEEE Computer Society Conference on Computer Vision and Pattern Recognition Workshops (CVPRW), Jun. 20, 2011, pp. 109-116, XP031926582.

Henrik O. Johansson et al., "A 200-MHz CMOS Bit-Serial Neural Network," ASIC Conference and Exhibit 1994, pp. 312-315, XP010140466.

Janardan Misra et al., "Artificial Neural Networks in Hardware: A Survey of Two Decades of Progress," Neurocomputing vol. 74, No. 1-3, Dec. 31, 2010, pp. 239-255, XP027517200.

* cited by examiner

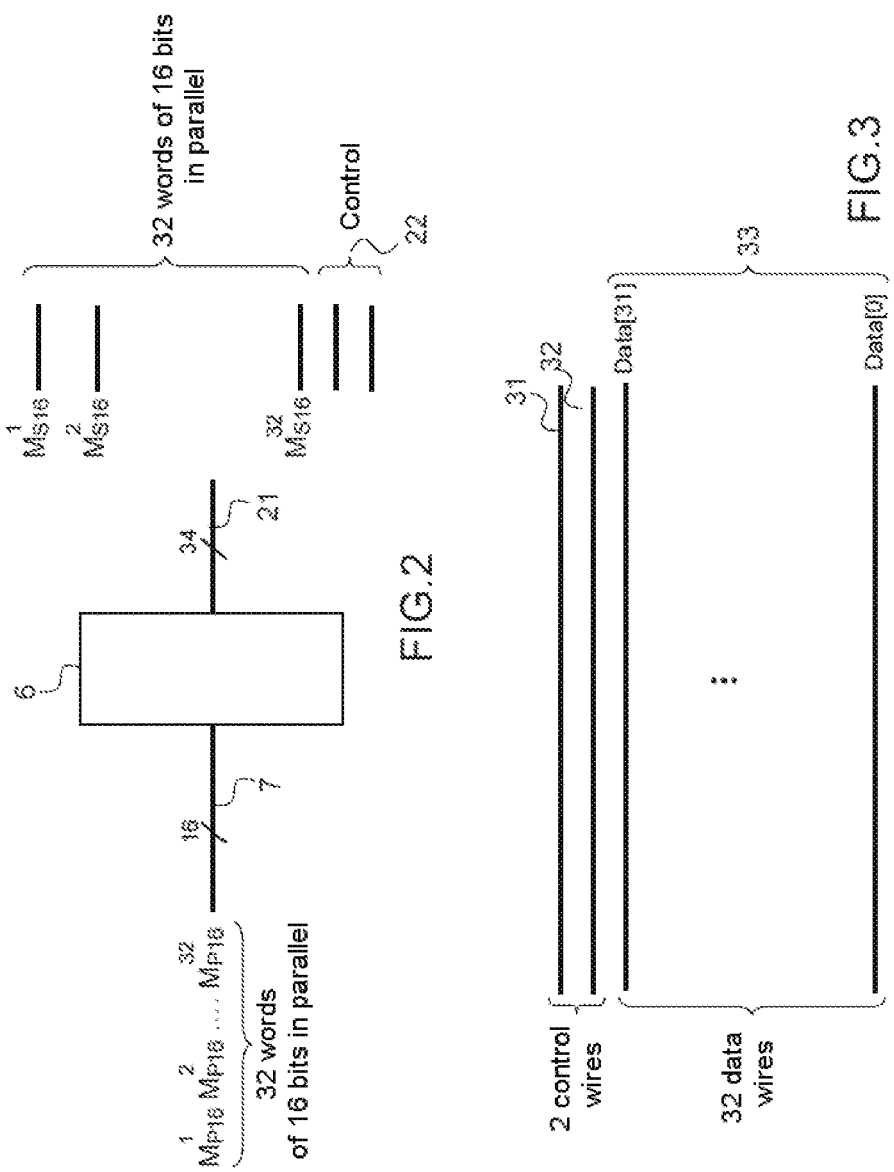

ELECTRONIC CIRCUIT, IN PARTICULAR CAPABLE OF IMPLEMENTING A NEURAL NETWORK, AND NEURAL SYSTEM

CROSS-REFERENCE TO RELATED APPLICATIONS

This application is a National Stage of International patent application PCT/EP2014/070717, filed on Sep. 29, 2014, which claims priority to foreign French patent application No. FR 1359666, filed on Oct. 4, 2013, the disclosures of which are incorporated by reference in their entirety.

FIELD OF THE INVENTION

The present invention relates to a circuit capable of implementing a neural network. It also relates to a neural system.

The invention is notably applicable for implementing neural networks on silicon for the processing of various signals, including multidimensional signals such as images for example. More generally, the invention allows the efficient implementation on silicon of a complete processing chain for the signal via the approach using neural networks. It also allows the efficient implementation of conventional signal processing methods, useful for example in pre-processing prior to the neural network processing and/or in post-processing.

BACKGROUND

Neural networks are already widely used and may potentially be used in very many applications, notably in all devices, systems or methods making use of learning approaches or mechanisms used to define the function to be performed, in contrast to the more conventional approaches in which the actions to be carried out are defined in an explicit manner by a "program". A multitude of systems, stretching from the most sophisticated technical or scientific fields to the application areas of everyday life, are thus concerned. All these applications demand ever improving levels of performance notably in terms of efficiency, of adaptability, of size and of power consumption. The algorithms implemented are essential for achieving these levels of performance. The hardware architecture, allowing these algorithms to be implemented, must also be taken into account for achieving these levels of performance, in particular at a time when the growth in frequency of the processors is stagnating or at least seems to have reached its limits.

As a first approximation, neural hardware architectures may be categorized according to two axes:

A first axis relates to their structure, where the latter may be digital or analog, or even a hybrid structure;

A second axis relates to their specialization with regard to the neural networks able to be implemented, where the architectures may be specialized in a few well-defined neural networks, such as the RBF (Radial-Basis Function) or the Kohonen feature map, or may be generic, notably programmable in order to allow a wider variety of networks to be implemented.

The types of architectures investigated in the framework of the present patent application are associated with generic and specialized circuits, using a digital implementation.

Within this framework, one problem to be solved is to enable the efficient fabrication on silicon, or any other circuit, of a complete processing chain for the signal, in the generic sense, via the neural networks approach. This generic problem may be broken down according to at least the following four problems, demonstrated by the prior art:

The signal processing chains of this type include, in general, more conventional signal processing functions, for example convolutions on a signal or an image, in pre-processing or post-processing operations. The conventional systems use specialized processors to carry out these processing operations, in addition to the neural processing architecture, ending up with a more complex and bulkier system, and which consumes more power;

The type of neural network used is highly dependent on the application, or even on the data set. As a general rule, the circuits used for implementing these neural networks are specialized for a few types of networks and do not allow an efficient implementation of various types of neural networks or indeed of variable topologies;

Also associated with the preceding point, another implementation parameter that can vary is the size of the network, in other words notably the numbers of inputs and the numbers of neurons. Certain circuits used for neural processing are not expandable, thus not allowing the implementation of neural networks whose size exceeds their capacity;

Since the application areas for neural networks are very varied, the dynamic behavior of the weight vectors and of the inputs of the neural network is consequently very variable. Moreover, for the same application and the same neural network, the dynamic behavior of the weight vectors can vary as a function of the phase in which it is operating in the case of on-line learning. In typical cases, a dynamic behavior of 16 bits on the weight vectors during the learning phase is necessary, whereas in the processing phase, a dynamic behavior of only 8 bits may suffice. The dimensions of the conventional architectures are designed for the worst case scenario both with regard to the operators and interconnections and also as regards the memory. They do not allow any flexibility in the dynamic behavior of the weight vectors to be obtained with respect to the application and hence just the quantity of silicon necessary to always be used.

Solutions are known, but none of them solve all of these four problems, and when they address one or the other of these problems, these solutions are insufficient.

Amongst these solutions, the circuit described in the document by Young, D; Lee, A. W H and Cheng, L. M., "*Hardware realisation of artificial neural network with application to information coding,*" *Neural Networks,* 1994. *IEEE World Congress on Computational Intelligence.,* 1994 *IEEE International Conference on,* vol. 6, no., pp. 3982, 3985, 27 Jun.-2 Jul. 1994, may be mentioned. This circuit comprises eight neurons, with neural processing operations and a serial communication with a precision of 16 bits, which seems to be fixed. Aside from the fact that the processing precision seems to be fixed, the very low level of parallelism of the architecture renders it unsuitable for the intensive processing of data.

Another solution is disclosed in the document by lenne, P. and Viredaz, M. A., "*GENES IV: A bit-serial processing element for a built-model neural-network accelerator,*" *Application-Specific Array Processors,* 1993. *Proceedings., International Conference on,* vol., no., pp. 345, 356, 25-27 Oct. 1993, presenting a systolic table of PEs (Processing Element), each PE corresponding to a synapse of the neural network. The inter-PE communication and the processing are carried out in series, however none of the good properties of this mode of processing is used, given that it is seen as a limitation. This circuit is seen as generic, allowing different classes of neural networks, of the Multi-Layer Perceptron or Kohonen feature map type, to be implemented. A fast coefficient exchange (or 'shadow register') is implemented. The systolic model has, for some time, been seen as having numerous advantages for the implementation of neural networks, which implies that many architectures use it. Thus, in addition to the preceding document may be mentioned the document by Ramacher, U.; Raab, W.; Hachmann, J. A. U.; Beichter, J.; Bruls, N.; Wesseling, M.; Sicheneder, E.; Glass, J.; Wurz, A.; Manner, R., "*SYNAPSE-1: a high-speed general purpose parallel neurocomputer system,*" Parallel Processing Symposium, 1995. Proceedings., 9th International, vol., no., pp. 774, 781, 25-28 Apr. 1995, having a dedicated weight vector memory and by Eppler, W.; Fischer, T.; Gemmeke, H.; Menchikov, A., "*High speed neural network chip for trigger purposes in high energy physics,*" Design, Automation and Test in Europe, 1998, Proceedings, vol., no., pp. 108, 115, 23-26 Feb. 1998, with a parallel implementation of the operators and a possibility of cascading providing it with the property of expandability.

Other processors are more generic and more developed. In particular, the solution described in the document by N. Mauduit, et al., "*L-Neuro 1.0: A Piece of Hardware LEGO for Building Neural Network Systems,*" IEEE Trans. Neural Networks, Vol. 3, No. 3, May 1992, pp. 414-422, discloses a dedicated neural processor, without pre-post-processing, with a precision that is variable as a function of the phase of processing by learning over 16 bits and recognition over 8 bits. It supports the virtualization of the neurons by a mechanism of direct memory access (DMA) and the multiplication of the computing units is in series. A next generation described in the document by M. Duranton, "*L-Neuro 2.3: A VLSI for Image Processing by Neural Networks,*" microneuro, pp. 157, 5th International Conference on Microelectronics for Neural Networks and Fuzzy Systems (MicroNeuro '96), 1996, adds the support for intensive signal processing with DSP (Digital Signal Processing) units for processing the signal and parallelism. The memory is unified, with no dedicated weight vector memory, and the interconnections provide an efficient support for locality and broadcast. However, this solution no longer supports the variable precision to the nearest bit; nor is the interconnection hierarchical.

As the interconnection plays a crucial role in the implementations of neural networks, architectures such as that described in the document by Hammerstrom, D., "A VLSI architecture for high-performance, low-cost, on-chip learning," Neural Networks, 1990, 1990 IJCNN International Joint Conference on, vol., no., pp. 537, 544 vol. 2, 17-21 Jun. 1990, have placed it at the heart of their operation. Thus, this type of architecture supports broadcasting in a very efficient manner together with local inter-processor connections. The calculation aspect is devolved to DSP units, by establishing a relatively generalist architecture. The communication aspect is also at the heart of the architecture described in the document of Yasunaga, M.; Masuda, N. et al., "*A self-learning neural network composed of 1152 digital neurons in wafer-scale LSIs,*" Neural Networks, 1991. 1991 IEEE International Joint Conference on, vol., no., pp. 1844, 1849 vol. 3, 18-21 Nov. 1991, with the use of a TDMA (Time Division Multiple Access) bus disposed in a hierarchical manner and allowing the generation and transmission of information.

Serial communication and processing are at the heart of the document by Johansson, H. O. et al., "*A 200-MHz CMOS bit-serial neural network,*" ASIC Conference and Exhibit, 1994. Proceedings., Seventh Annual IEEE International, pp. 312, 315, 19-23 Sep. 1994. Thus, the utility of variable precision is discussed, without however any specific application. The solution described supports cascading for the extension but not learning on line, nor even on a chip, off line.

Some architectures also make the deliberate choice to use parallel communication and processing of the data. In particular, the architecture described in the document by Wojciechowski, E., "*SNAP: a parallel processor for implementing real-time neural networks*" Aerospace and Electronics Conference, 1991. NAECON 1991, Proceedings of the IEEE 1991 National, vol., no., pp. 736, 742 vol. 2, 20-24 May 1991, uses parallel operators, and even SIMD (Single Instruction Multiple Data) in order to enhance the parallelism of the processing. As in the document by M. Duranton hereinabove, the memory on the circuit is a shared resource and the generic aspect of the architecture allows it to implement various types of neural networks such as associative memories, Hopfield and the multi-layer perceptron networks.

The aforementioned architectures do not use a floating calculation but this property has been used in the architecture described in the document by Kondo, Y. et al., "*A 1.2 GFLOPS neural network chip for high-speed neural network servers,*" Solid-State Circuits, IEEE Journal of, vol. 31, no. 6, pp. 860, 864, June 1996, implemented with floating operators interconnected in a ring, notably allowing a simple extension of the network. The memories are unified and the operators are parallel.

More recently, new types of neural networks have appeared: 'deep networks' notably with CNN (Convolutional Neural Networks) and HMAX algorithms. These very efficient algorithms and the advances in the area of CMOS technologies have allowed new architectures to be developed. For example, the architecture described in the document by Farabet, C., "*NeuFlow: A runtime reconfigurable dataflow processor for vision,*" Computer Vision and Pattern Recognition Workshops (CVPRW), 2011 IEEE Computer Society Conference on, vol., no., pp. 109, 116, 20-25 Jun. 2011, is specially designed for the efficient implementation of these networks which are important in vision algorithms. Thus, this architecture is a dataflow architecture dedicated to applications of the vision type.

On the other hand, in the 2000s, more optimized architectures have appeared. Notably, an evolution of the ZISC (Zero Instruction Set Computer) processor from the company IBM has been designed by the company General Vision Inc.; it is introduced on the website http://www.general-vision.com. This neural processor, called CM1K, does not do any signal processing (such as convolution for example), except the direct recognition of models on a video signal transmitted to the neurons.

SUMMARY OF THE INVENTION

One aim of the invention is therefore to at least solve all of the aforementioned problems. For this purpose, one subject of the invention is a circuit such as defined by the claims.

A further subject of the invention is a neural system composed of circuits such as defined by the claims.

BRIEF DESCRIPTION OF THE DRAWINGS

Other features and advantages of the invention will become apparent with the aid of the description that follows, presented with regard to the appended drawings which show:

FIG. 2, an illustration of the parallel series transformation mode applied to the input of the circuit;

FIG. 3, one example of the structure of the buses internal to a circuit according to the invention.

DETAILED DESCRIPTION

Figure 1:
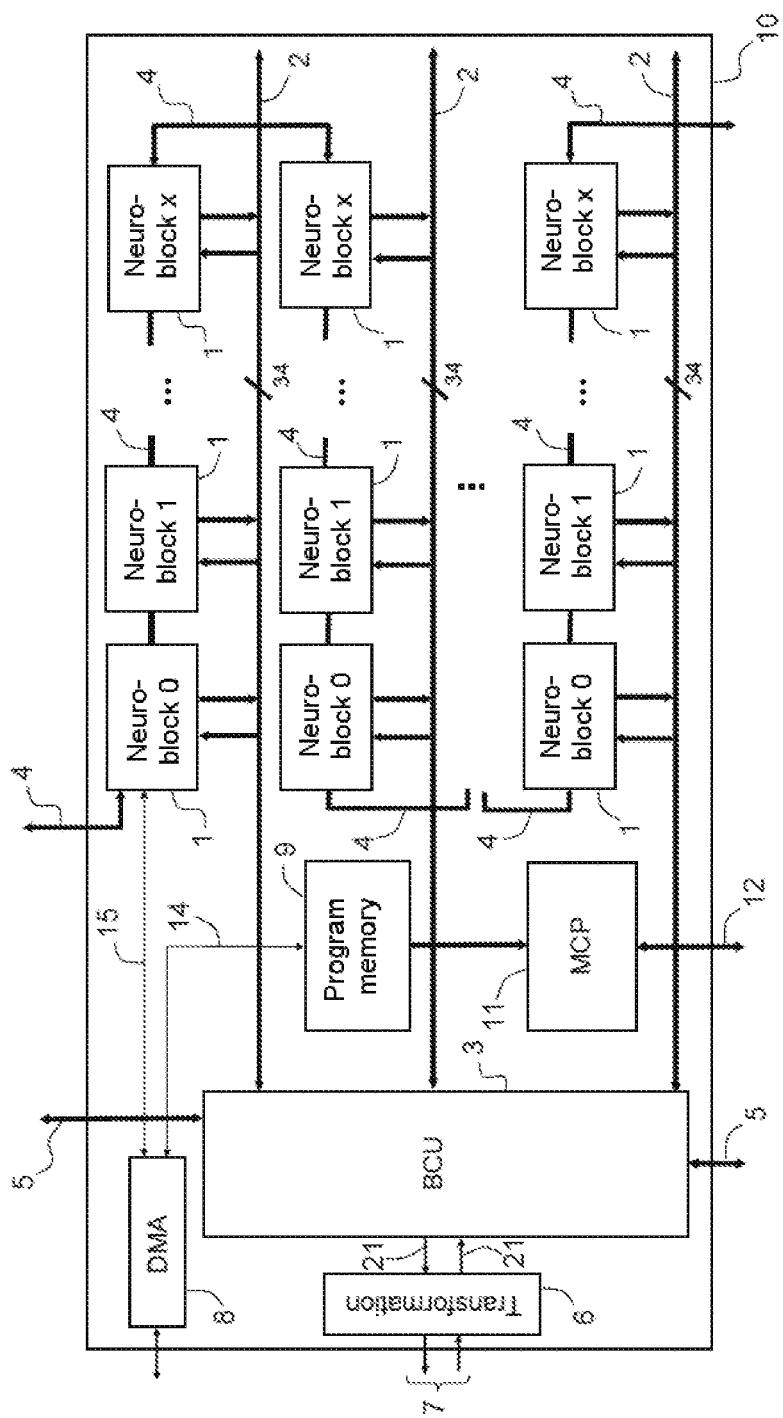
FIG. 1, one example of a circuit according to the invention.

FIG. 1 shows one example of a hardware architecture according to the invention, for the implementation of a neural network. More particularly, this architecture is described by a circuit 10 designed to implement a neural network. This circuit may itself be connected with other identical circuits; a neural system according to the invention comprises circuits 10, juxtaposed and/or cascaded, as will be described in the following.

In the example in FIG. 1, the circuit 10 comprises 32 modules 1, which may be identical, referred to in the following part as neuro-blocks. A neuro-block may be considered as the basic element since it is designed to implement an assembly of neurons. In a known manner, a neuron of order i performs a function of the type:

$$R_i = f\left(\sum_j w_{ij} E_j\right)$$

$w_{ij}$ and $E_j$ being respectively the synaptic weight vectors associated with the neuron and its inputs. A neuro-block comprises the arithmetic and logic units (ALU) allowing all these neural functions to be performed. One possible embodiment of the neuro-blocks will be described in the following.

The neuro-blocks 1 are distributed in branches. A branch is composed of several neuro-blocks 1 and of a broadcasting bus 2 shared by the neuro-blocks connected to this bus. The branches are constructed in such a manner that only a defined number of neuro-blocks share the same bus. This creates a segmentation of the interconnections between the blocks, notably allowing the power consumption to be optimized and the cycle time in a multiple access multiplexing mode of the TDMA type to be reduced.

In a configuration with 32 neuro-blocks for example, the neuro-blocks can be divided up into 4 branches of 8 neuro-blocks or into 8 branches of 4 neuro-blocks.

Advantageously, these branches allow parallelism of communication to be introduced to the architecture. Indeed, a neuro-block 1 of a branch can exchange its data with the neuro-blocks within its branch without interfering with the neuro-blocks of another branch.

Furthermore, all the neuro-blocks are for example connected via an interconnection line 4 having the structure of a daisy-chained bus. More precisely, the arithmetic and logic units (ALU) of each neuro-block are connected to this bus. The interconnection line 4 "inter-ALU" thus passes through all the neuro-blocks 1 of the same circuit 10. In the case of a daisy-chaining of circuits 10, the ALU of the last neuro-block of a circuit precedes the ALU of the first neuro-block of the neighboring circuit. For this purpose, the interconnection line 4 is designed to be extended outside of the circuit 10 upstream and downstream of the neuro-blocks.

Each branch is connected to a routing and computing unit 3, referred to in the following as BCU (Broadcast and Computation Unit), the exchanges between the various branches taking place via this unit 3.

The BCU unit 3 furthermore receives input data and transmits data to the circuit output via a module for transformation of the input/output data 6.

This module 6 is dedicated to the transformation of the input data coded according to a parallel protocol into data coded according to a serial protocol. The module also carries out the inverse transformation, transforming the internal serial data into parallel data at the output of the block.

FIG. 2 illustrates the type of transformation carried out by the module 6. In the example shown, the words at the input are coded over 16 parallel bits.

32 words $M^1_{P16}$, $M^2_{P16}$, ... $M^{32}_{P16}$, for example successively arriving at the module 6 at the input of the circuit 10 via a parallel bus 7, are transformed into 32 words of 16 serial bits $M^1_{S16}$, $M^2_{S16}$, ... $M^{32}_{S16}$. The 32 words are parallelized over an internal bus 21, one wire being dedicated to each word coded in series. This bus 21 carries this serial coded input data to the routing module 3, which broadcasts this data to the branches and other internal or external components.

In the exemplary embodiment shown in FIGS. 1 and 2, the internal communications protocol uses two control bits 22. Thus, the internal bus 21 at the output of the module 6 comprises 34 bits, just like all the internal broadcasting buses 2. Indeed, according to the invention, all the data exchanges within a circuit 10 take place according to a protocol of the serial type. More generally, all the data are coded in series throughout the block. All the components, memory and computing units notably, or internal interconnections process the data coded in series. The links such as the broadcasting bus 2, the interconnection line 4 and all the other interface links with the outside have a 34-bit format. Generally speaking, the internal buses operate according to the same serial protocol with the same number of wires in parallel.

The serial coding is therefore applied throughout the internal structure of a circuit 10. For the coding within the memories, a transposed coding is thus implemented instead of a standard coding, the transposition being illustrated in FIG. 2 where 32 words of 16 bits in parallel are transformed into 32 words of 16 bits in series.

The precision of the data, parallel or series, may be different from 16 bits. It depends notably on the structure of the neuro-blocks 1. One precision can use 8 bits for example. Generally speaking, the parallel-series transformation module 6 receives N words of x bits sequentially at the input, according to a protocol of the parallel type for the number of bits, and the transform into N parallel words of x bits in series. As previously indicated, one wire of the internal input bus and, subsequently, of the broadcasting bus is dedicated to each word. When the buses of the circuit 10 comprise 32 bits, aside from the control bits, N is less than or equal to 32.

Advantageously, this serial coding throughout the internal structure provides a solution to the problem of the dynamic behavior of the inputs and of the weight vectors of the neural network. Indeed, the wholly serial implementation of the mechanisms internal to the architecture of the block allows the precision of the processing to be modulated according to the application, the data, the phase of execution, or even on the fly, and allows the unused resources to be re-used, for example the storage resources which are thus allocated to the nearest bit. Similarly, the lower the precision, the higher will be the processing speed of the architecture.

FIG. 3 shows one example of a structure of the signals on the broadcasting bus 2. This structure conforms to the mode of transformation of the module 6 and of the serial processing of all the data internal to a circuit 10. The bus comprises two control bits. A first bit 31 indicates that a valid data value is present on the bus. A second bit 32 indicates, depending on its state, whether the corresponding "flit" (a "flit" corresponding for example to each parallel word of 34 bits travelling over the bus) is a control "flit" or a part of the data.

The bus comprises 32 data wires, with one dedicated wire per word, each word being coded in series. Thus, the mode of transmission of the data is applied according to one wire per word, 16 words being transmitted over the bus for transmitting 32 words of 16 bits, the transmission taking place in 16 cycles and at least one additional control cycle.

Advantageously, the BCU unit 3 notably performs two series of functions.

It notably carries out the broadcasting of the data, the routing of the data branch by branch, transfers between circuits 10 and the segmentation of the data. In particular, it manages the exchanges of data between the various branches but also the exchanges with other circuits 10. For this purpose, it comprises an interconnection bus 5 at the input/output so as to route or broadcast data to an external unit. Thus, the BCU unit 3 routes and broadcasts data to other circuits via the interconnection bus 5 connecting the BCU of the various circuits 10 composing a neural system.

Inside a circuit 10, the BCU unit broadcasts the data within the various buses 2, isolates the branches, and transmits data from one bus to another. Similarly, the BCU unit 3 can broadcast data to the BCU units of other circuits 10. For these routing and broadcasting operations, the communications protocol uses an additional control word which contains the identifier of a target neuro-block, in other words the destination neuro-block for the message, or a broadcasting code indicating to which branches or to which other BCU units the message is to be sent.

The second series of functions relates to computing operations. In particular, the BCU unit 3 carries out global operations on the data owing to the fact that it has a view on each data value, in particular it can perform operations on the values (additions, calculation of minimum/maximum, etc.). It may, for example, perform the sum or extract the maximum of the data received on several branches and broadcast this result over a set of branches.

This unit 3 is composed of routing resources, for example multiplexers, and computing units notably allowing the functions and operations described hereinabove to be carried out.

In one possible embodiment, for the global operations such as for example the calculation of the global maximum, each neuro-block 1 is programmed to send its own local maximum, coded in series, to the BCU unit 3. This transmission uses for example a dedicated wire of the broadcasting bus 2, one wire of the bus being assigned to each neuro-block 1. Subsequently, the global operation carried out by the unit 3 samples the various data according to their precision, defined by the number of bits, and performs the global calculation.

A direct memory access (DMA) module 8 allows an extension of the available memory. It provides the function of central management of the memory space available for the circuit 10. For this purpose, it is coupled via buses 14, 15 to an internal memory 9, containing a program, and to each neuro-block, more particularly to the memory management unit of each neuro-block.

In particular, it can manage an external memory replacing the internal memory 9, or supplementing it, for processing operations requiring a large memory capacity, greater than the capacity of the internal memory. This is the case, for example, for storing synaptic coefficients, certain programs or image data.

The DMA module may be connected to the bus of a system incorporating the circuit 10 notably allowing the latter to use the memory of the system. It may also be connected to a dedicated external memory, outside of the system.

The architecture according to the invention therefore allows the memory to become a shared resource allowing the total memory capacity available to be increased, either in order to store large quantities of data at the input in signal processing mode or large quantities of weight vectors for complex networks in a recognition mode using neural functions.

The DMA module is also a central management unit for the memory of the block. For this purpose, it is linked to the management unit for the local memory of each neuro-block 1. The DMA mechanism connecting all the processing modules, notably the neuro-blocks and the BCU unit 3, allows a virtualization of the data and of the weight vectors to be obtained. This mechanism for virtualization of the data notably allows the implementation of neural networks or of processing operations on images exceeding the size of the internal memory of the circuit 10.

One additional function of the DMA can be to read or to write data in the internal memory 9 and/or in the neuro-blocks, for example in the phase for initialization of the neural network or else in a debugging phase in order to supply the local intermediate results to an external setup device.

A control module 11 has the function of master control processor or MCP. A circuit 10 may then be considered as a processor of the VLIW (Very Long Instruction Word) type with a width corresponding to the number of branches, 4 or 8 for example. A word within a global instruction of this VLIW processor corresponds to a branch and is therefore sent to the internal control unit of each neuro-block 1. The neuro-blocks of each branch are thus controlled by an instruction of the SIMD (Single Instruction Multiple Data) type, all the arithmetic and logic units (ALU) of all the neuro-blocks 1 of a branch executing the instructions sent by the MCP module 11. The memory of this module 11 is for example linked to the DMA module 8 so as to be able to benefit from the extension of available memory, notably for implementing complex programs requiring a large memory capacity.

The control module 11 is interfaced to the outside of the circuit 10 via a link 12. This link notably allows the module 11 to be synchronized with other control modules of circuits 10 and hence the operation of the latter to be synchronized within a neural assembly composed of these circuits. The link 12 also allows the module 11 to receive external instructions.

A neuro-block 1 is a main computing module within the circuit 10. Several embodiments are possible. It typically comprises an assembly or "cluster" of 32 serial arithmetic and logic units ALU operating according to a SIMD (Single Instruction Multiple Data) mode; in other words, a neuro-block in fact implements 32 neurons. It comprises for example the following sub-modules and interfaces:

A direct memory access DMA sub-module notably managing an internal memory of the RAM type supplying the 32 modules ALU;

Input/output interfaces for coupling the neuro-block to the broadcasting bus 2 with a serial protocol;

Local interconnections between the ALUs notably allowing all the necessary calculations to be performed.

Advantageously, the invention allows a reconfigurable and expandable architecture to be obtained for the efficient implementation of neural networks.

In particular, the complete serial configuration allows a variable precision to be obtained to the nearest bit up to 32 bits, or even more depending on the number of bits available on the internal buses. This allows all the storage resources to be used in the compromise notably between the precision and the number of synapses.

The combination of serial transmission, of local communications and of broadcasting allows all the topologies of neural networks to be efficiently implemented.

The structure of the interconnections with various hierarchical broadcasting and routing mechanisms allows, at a lower cost in terms of surface area of silicon, networks going from those with very little connectivity to those that are totally connected to be implemented. More precisely, the structure of hierarchical interconnections allows, at the same time, an efficient mode of broadcasting, the routing and a simple extension of the neural system by the possibility of cascading or juxtaposition of the circuits 10 composing the system. The cascading may be achieved by the interconnection bus 4 connecting the neuro-blocks together and from one circuit to another. The juxtaposition may be achieved by the interconnection bus 5 connecting the BCU units 3 of the various circuits 10. The extension of the system by cascading or by broadcasting between several circuits 10 furthermore conserves the integrity of the serial coding, which ensures generality with regard to the dynamic behavior of the circuits.

The structure in branches notably allows independent calculations (in particular non-systolic) with an appropriate control (parallelization of the data with respect to the possible tasks), while at the same time conserving a simple control mechanism, combining pre-processing calculations and the calculations carried out by the neural networks. Moreover, the implementation of very generic computing operators, such as those contained in the BCU unit 3, going beyond the simple implementation of neural networks, increases the possibility of performing complex calculations, notably in cooperation with the extension of memory capacity by the DMA modules 8.

The invention has been described for an application to neural networks. A circuit according to the invention is indeed capable of implementing a neural network. However, a circuit according to the invention is also applicable to conventional signal processing operations. The modules 1, referred to as neuro-blocks, can indeed perform elementary processing functions on the signal which are not specific to neural networks, the principle of operation of the circuit such as previously described remaining the same. In particular, advantageously, the invention allows the efficient implementation of conventional signal processing methods, useful notably prior to the neural processing and/or after the neural processing (pre- and post-processing).

The invention claimed is:

1. A circuit, comprising:
a series of neuro-blocks configured to implement a neural network, said neuro-blocks (i) each comprising a plurality of neurons and (ii) being grouped together in branches, each of the branches comprising a group of neuro-blocks and a broadcasting bus, the neuro-blocks being connected to said broadcasting buses;
a routing unit connected to the broadcasting buses of said branches and configured to route data to said branches; and
a transformation module connected to the routing unit via an internal bus and configured to be connected, at an input of said circuit, to an external bus, said module carrying out a transformation of a format of data inputted by said external bus, a first message of N input words with x bits coded in parallel being transformed into a second message of N words with x bits coded in series, the N words of the second message being parallelized over the internal bus at an output of said module, one wire of the internal bus being dedicated to each of the N transformed words, one bit of the each word being sequentially broadcast over the broadcasting buses of the branches via the routing unit at a time such that all processing operations of the series of the neuro-blocks are carried out according to a serial communications protocol,
wherein an inverse transformation is performed by the transformation module such that a third message of N words with the x bits coded in series is transformed into a fourth message of N output words with the x bits coded in parallel.

2. The circuit as claimed in claim 1, wherein the routing unit comprises an input/output bus so as to route and to broadcast data to or from an external unit according to said serial communications protocol.

3. The circuit as claimed in claim 1, wherein the communications protocol comprises, for the transmission of a given message, information indicating a target unit.

4. The circuit as claimed in claim 3, wherein said information indicates an identifier of one or more neuro-blocks.

5. The circuit as claimed in claim 3, wherein said information indicates one or more destination branches or an external unit for said given message.

6. The circuit as claimed in claim 1, wherein the routing unit is further configured to perform global processing operations on data.

7. The circuit as claimed in claim 1, further comprising:
a module for direct memory access (DMA) coupled via a bus to each neuro-block, said DMA module being configured to be interfaced with an external memory.

8. The circuit as claimed in claim 7, further comprising:
a central control module, wherein said module for direct memory access is connected to said central control module via a bus.

9. The circuit as claimed in claim 1, wherein the neuro-blocks each comprise a set of arithmetic and logic units, and wherein all the arithmetic and logic units are connected to a same interconnection bus, said interconnection bus being configured to be extended outside of said circuit upstream and downstream of the neuro-blocks.

10. The circuit as claimed in claim 1, wherein the broadcasting buses comprise available data wires.

11. The circuit as claimed in claim 1, wherein the neuro-blocks are evenly divided in the groups.

12. The circuit as claimed in claim 1, wherein it performs processing functions on a signal.

13. The circuit as claimed in claim 12, wherein it performs pre-processing and/or post-processing functions on the signal with respect to neural processing functions.

14. A neural system, comprising several circuits as claimed in claim 1.

15. The circuit as claimed in claim 1, wherein a width of the external bus is equal to or greater than a number of bits per word, and wherein a width of the internal bus is equal to or greater than a number of words in the message.

16. The circuit as claimed in claim 1, wherein said module further carries out a transformation of another format of data inputted by said internal bus, the data inputted by said internal bus having been routed, via the routing unit, from said branches.

17. The circuit as claimed in claim 1, wherein the transformation allows for a reduction in a surface area of silicon for the circuit.

18. The circuit as claimed in claim 1, wherein each of the neuro-blocks implements a node of the neural network.

19. The circuit as claimed in claim 1, wherein a number of neuro-blocks is equal to the number N of the words.

20. The circuit as claimed in claim 1, wherein the neuro-blocks are daisy-chained together.

21. The circuit as claimed in claim 1, wherein a neuro-block of a branch exchanges data with other neuro-blocks of the same branch without interfering with neuro-blocks of another branch.

* * * * *